US009810430B2

(12) United States Patent
Sandoval et al.

(10) Patent No.: US 9,810,430 B2
(45) Date of Patent: Nov. 7, 2017

(54) CONJOINED GROMMET ASSEMBLY FOR A COMBUSTOR

(71) Applicant: United Technologies Corporation, Hartford, CT (US)

(72) Inventors: Jonathan P. Sandoval, Hebron, CT (US); Randolph J. Smith, Ellington, CT (US)

(73) Assignee: United Technologies Corporation, Farmington, CT (US)

( * ) Notice: Subject to any disclaimer, the term of this patent is extended or adjusted under 35 U.S.C. 154(b) by 386 days.

(21) Appl. No.: 14/581,568

(22) Filed: Dec. 23, 2014

(65) Prior Publication Data

US 2015/0323182 A1 Nov. 12, 2015

Related U.S. Application Data

(60) Provisional application No. 61/920,227, filed on Dec. 23, 2013.

(51) Int. Cl.

*F23R 3/06* (2006.01)
*F23R 3/00* (2006.01)
*F23R 3/02* (2006.01)

(52) U.S. Cl.

CPC ................ *F23R 3/02* (2013.01); *F23R 3/002* (2013.01); *F23R 3/005* (2013.01); *F23R 3/06* (2013.01); *F23R 2900/03041* (2013.01); *F23R 2900/03044* (2013.01); *Y02T 50/675* (2013.01)

(58) Field of Classification Search

CPC .. F23R 3/002; F23R 3/007; F23R 3/04; F23R 3/045; F23R 3/06; F23R 2900/03041–2900/03044; F23R 3/08

See application file for complete search history.

(56) References Cited

U.S. PATENT DOCUMENTS 3,545,202 A 12/1970 Batt
4,132,066 A 1/1979 Austin
4,426,841 A 1/1984 Cornelius
4,622,821 A 11/1986 Madden
4,653,279 A 3/1987 Reynolds
4,700,544 A 10/1987 Fucci
5,687,572 A 11/1997 Schrantz et al.
6,681,577 B2 * 1/2004 Bolender ................ F23R 3/002 60/754
8,056,342 B2 11/2011 Shelley
8,387,396 B2 * 3/2013 Chen ....................... F01D 9/023 60/752
2011/0048024 A1 3/2011 Snyder et al.
2012/0102963 A1 5/2012 Corr et al.
2013/0031783 A1 * 2/2013 DiCintio .................. F23R 3/06 29/890.02

* cited by examiner

*Primary Examiner* — Pascal M Bui Pho
*Assistant Examiner* — Rene Ford
(74) *Attorney, Agent, or Firm* — O'Shea Getz P.C.

(57) ABSTRACT

A conjoined grommet assembly for a combustor wall assembly of a gas turbine engine has a first grommet defining at least in-part a first dilution hole, and a second grommet defining at least in-part a second dilution hole. The first and second dilution holes are spaced closely together such that the first grommet is in contact with the second grommet.

16 Claims, 5 Drawing Sheets

CONJOINED GROMMET ASSEMBLY FOR A COMBUSTOR

This application claims priority to U.S. Patent Appln. No. 61/920,227 filed Dec. 23, 2013.

BACKGROUND

The present disclosure relates to a combustor and, more particularly, to a conjoined grommet assembly for a combustor of a gas turbine engine.

Gas turbine engines, such as those that power modern commercial and military aircraft, include a fan section to propel the aircraft, a compressor section to pressurize a supply of air from the fan section, a combustor section to burn a hydrocarbon fuel in the presence of the pressurized air, and a turbine section to extract energy from the resultant combustion gases and generate thrust.

The combustor section typically includes a wall assembly having an outer shell lined with heat shields that are often referred to as floatwall panels. Together, the panels define a combustion chamber. A plurality of dilution holes are generally spaced circumferentially about the wall assembly and flow dilution air from a cooling plenum and into the combustion chamber to improve emissions, and reduce and control the temperature profile of combustion gases at the combustor outlet to protect the turbine section from overheating. To ensure a satisfactory temperature profile at the chamber outlet, there must be adequate penetration of the dilution air, coupled with the correct number of dilution holes to form sufficient localized mixing zones in the chamber. The penetration of a round dilution hole is generally a function of its diameter. That is, if the total dilution hole area is spread over a large number of small holes, penetration will be inadequate, and a hot core (i.e. radial center of combustion chamber) will persist through the dilution zone of the chamber. In the opposite extreme, the use of a small number of large holes will result in a cold core, due to over-penetration and unsatisfactory mixing.

To optimize this outlet temperature profile, the dilution holes are strategically sized and distributed both axially and circumferentially through the wall assembly. Part of this strategic sizing and location of dilution holes must include consideration of combustor chamber pressure differentials, cross flows and minimization of hot spots upon the panels and typically located proximate to the dilution holes. Unfortunately, each dilution hole is generally defined by a distinct and specific grommet that extends between the panel and the shell. Each grommet is traditionally spaced from the other grommets of the adjacent cooling holes. This spacing (i.e. the wall thicknesses of the grommets) limits the orientation or proximity of the dilution holes to one-another.

SUMMARY

A combustor grommet assembly according to one, non-limiting, embodiment of the present disclosure includes a first grommet defining at least in-part a first dilution hole, and a second grommet defining at least in-part a second dilution hole and in contact with the first grommet.

Additionally to the foregoing embodiment, the first and second grommets share a common outer face.

In the alternative or additionally thereto, in the foregoing embodiment the first grommet includes a first centerpoint, a first outer perimeter, and a first distance from the first centerpoint to the first outer perimeter; the second grommet includes a second centerpoint, a second outer perimeter, and a second distance from the second centerpoint to the second outer perimeter; and, a distance between the first and second centerpoints being less than the sum of the first and second distances when measured between the first and second centerpoints.

In the alternative or additionally thereto, in the foregoing embodiment the first and second distances are outer radius vectors.

In the alternative or additionally thereto, in the foregoing embodiment the radius vectors are radii.

In the alternative or additionally thereto, in the foregoing embodiment the first dilution hole is defined by a continuous first inner face and the second dilution hole is defined by a continuous second inner face.

In the alternative or additionally thereto, in the foregoing embodiment the first dilution hole is a primary dilution hole and the second dilution hole is a wake hole.

In the alternative or additionally thereto, in the foregoing embodiment the assembly includes a grommet defining a second wake hole conjoined to the grommet defining the primary dilution hole.

A combustor according to another, non-limiting, embodiment of the present disclosure includes a heat shield including a hot side and an opposite cold side, a combustion chamber defined at least in-part by the heat shield, a first grommet joined to the heat shield and defining a first dilution hole communicating through the heat shield, and a second grommet joined to the first grommet and the heat shield and defining at least in-part a second dilution hole communicating through the heat shield.

Additionally to the foregoing embodiment, the combustor includes a shell spaced from and opposing the cold side with a cooling cavity defined between the cold side and the shell and containing at least in part the first and second grommets.

In the alternative or additionally thereto, in the foregoing embodiment the first and second dilution holes communicate through the shell.

In the alternative or additionally thereto, in the foregoing embodiment the first dilution hole does not communicate directly with the second dilution hole.

In the alternative or additionally thereto, in the foregoing embodiment the first and second grommets together define a seat.

In the alternative or additionally thereto, in the foregoing embodiment the seat has a cylindrical contour.

In the alternative or additionally thereto, in the foregoing embodiment the seat seals upon the shell.

In the alternative or additionally thereto, in the foregoing embodiment the first and second grommets are an integral part of and unitary to the heat shield.

In the alternative or additionally thereto, in the foregoing embodiment the first dilution hole is a primary dilution hole and the second dilution hole is a wake hole.

In the alternative or additionally thereto, in the foregoing embodiment the combustor includes a plurality of grommets with the first and second grommets being of the plurality of grommets, and the heat shield is substantially cylindrical and concentric to an axis of the combustor and the plurality of grommets are joined and circumferentially continuous dividing the cavity axially into upstream and downstream portions.

In the alternative or additionally thereto, in the foregoing embodiment the plurality of dilution holes include a plurality of wake holes and a plurality of primary dilution holes.

In the alternative or additionally thereto, in the foregoing embodiment the plurality of wake holes are axially offset upstream from the plurality of primary dilution holes.

In the alternative or additionally thereto, in the foregoing embodiment each one of the plurality of wake holes are disposed circumferentially between adjacent primary dilution holes of the plurality of primary dilution holes.

The foregoing features and elements may be combined in various combination without exclusivity, unless expressly indicated otherwise. These features and elements as well as the operation thereof will become more apparent in light of the following description and the accompanying drawings. It should be understood, however, the following description and figures are intended to exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
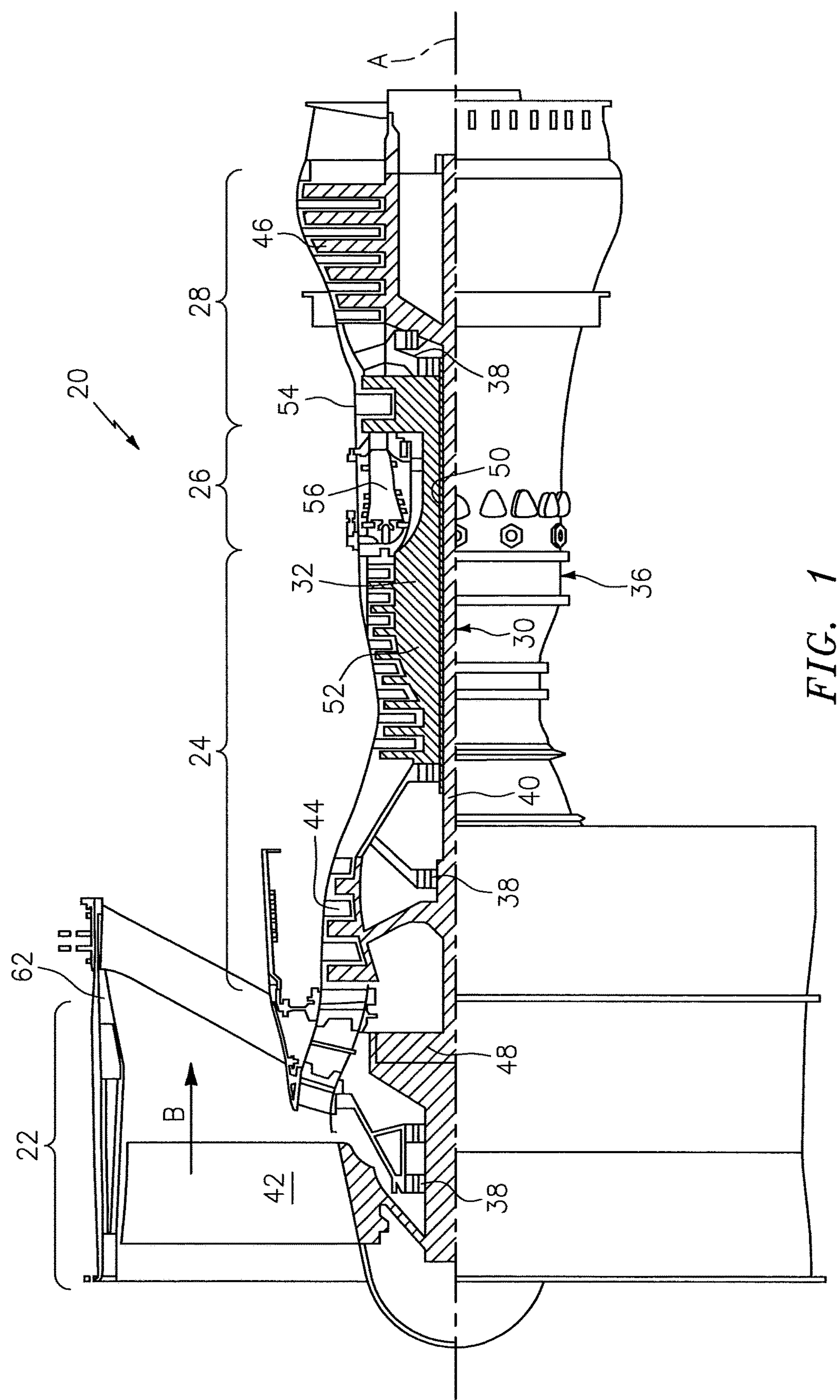
FIG. 1 is a schematic cross-section of a gas turbine engine.

FIG. 1 schematically illustrates a gas turbine engine 20 disclosed as a two-spool turbo fan that generally incorporates a fan section 22, a compressor section 24, a combustor section 26 and a turbine section 28. Alternative engines may include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiment, it should be understood that the concepts described herein are not limited to use with turbofans as the teachings may be applied to other types of turbine engine architecture such as turbojets, turboshafts, and three-spool turbofans with an intermediate spool.

The engine 20 generally includes a low spool 30 and a high spool 32 mounted for rotation about an engine axis A via several bearing structures 38 and relative to a static engine case 36. The low spool 30 generally includes an inner shaft 40 that interconnects a fan 42 of the fan section 22, a low pressure compressor 44 ("LPC") of the compressor section 24 and a low pressure turbine 46 ("LPT") of the turbine section 28. The inner shaft 40 drives the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor 52 ("HPC") of the compressor section 24 and a high pressure turbine 54 ("HPT") of the turbine section 28. A combustor 56 of the combustor section 26 is arranged between the HPC 52 and the HPT 54. The inner shaft 40 and the outer shaft 50 are concentric and rotate about the engine axis A. Core airflow is compressed by the LPC 44 then the HPC 52, mixed with the fuel and burned in the combustor 56, then expanded over the HPT 54 and the LPT 46. The LPT 46 and HPT 54 rotationally drive the respective low spool 30 and high spool 32 in response to the expansion.

In one non-limiting example, the gas turbine engine 20 is a high-bypass geared aircraft engine. In a further example, the gas turbine engine 20 bypass ratio is greater than about six (6:1). The geared architecture 48 can include an epicyclic gear train, such as a planetary gear system or other gear system. The example epicyclic gear train has a gear reduction ratio of greater than about 2.3:1, and in another example is greater than about 2.5:1. The geared turbofan enables operation of the low spool 30 at higher speeds that can increase the operational efficiency of the LPC 44 and LPT 46 and render increased pressure in a fewer number of stages.

A pressure ratio associated with the LPT 46 is pressure measured prior to the inlet of the LPT 46 as related to the pressure at the outlet of the LPT 46 prior to an exhaust nozzle of the gas turbine engine 20. In one non-limiting example, the bypass ratio of the gas turbine engine 20 is greater than about ten (10:1); the fan diameter is significantly larger than the LPC 44; and the LPT 46 has a pressure ratio that is greater than about five (5:1). It should be understood; however, that the above parameters are only exemplary of one example of a geared architecture engine and that the present disclosure is applicable to other gas turbine engines including direct drive turbofans.

In one non-limiting example, a significant amount of thrust is provided by the bypass flow path B due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as Thrust Specific Fuel consumption (TSFC). TSFC is an industry standard parameter of fuel consumption per unit of thrust.

Fan Pressure Ratio is the pressure ratio across a blade of the fan section 22 without the use of a fan exit guide vane system. The low Fan Pressure Ratio according to one non-limiting example of the gas turbine engine 20 is less than 1.45:1. Low Corrected Fan Tip Speed is the actual fan tip speed divided by an industry standard temperature correction of ($T/518.7^{0.5}$), where "T" represents the ambient temperature in degrees Rankine. The Low Corrected Fan Tip Speed according to one non-limiting example of the gas turbine engine 20 is less than about 1150 fps (351 m/s).

Figure 2:
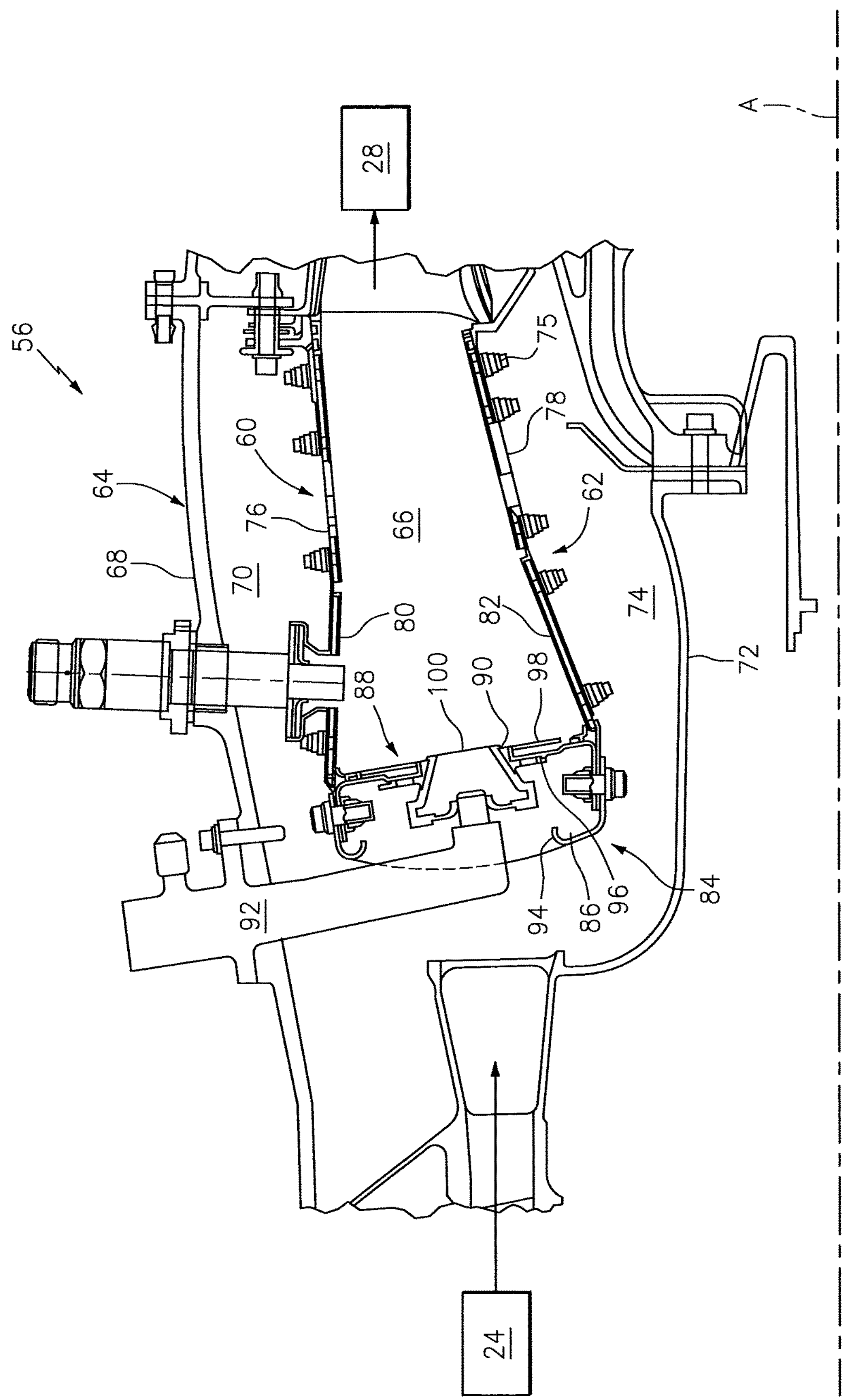
FIG. 2 is a cross-section of a combustor section.

Referring to FIG. 2, the combustor section 26 generally includes an annular combustor 56 with an outer combustor wall assembly 60, an inner combustor wall assembly 62, and a diffuser case module 64 that surrounds assemblies 60, 62. The outer and inner combustor wall assemblies 60, 62 are generally cylindrical and radially spaced apart such that an annular combustion chamber 66 is defined therebetween. The outer combustor wall assembly 60 is spaced radially inward from an outer diffuser case 68 of the diffuser case module 64 to define an outer annular plenum 70. The inner wall assembly 62 is spaced radially outward from an inner diffuser case 72 of the diffuser case module 64 to define, in-part, an inner annular plenum 74. Although a particular combustor is illustrated, it should be understood that other combustor types with various combustor liner arrangements will also benefit. It is further understood that the disclosed cooling flow paths are but an illustrated embodiment and should not be so limited.

The combustion chamber 66 contains the combustion products that flow axially toward the turbine section 28. Each combustor wall assembly 60, 62 generally includes a respective support shell 76, 78 that supports one or more heat shields or liners 80, 82. Each of the liners 80, 82 may be formed of a plurality of floating panels that are generally rectilinear and manufactured of, for example, a nickel based super alloy that may be coated with a ceramic or other temperature resistant material, and are arranged to form a liner array mounted to the respective shells 76, 78.

The combustor 56 further includes a forward assembly 84 that receives compressed airflow from the compressor section 24 located immediately upstream. The forward assembly 84 generally includes an annular hood 86, a bulkhead assembly 88, and a plurality of swirlers 90 (one shown). Each of the swirlers 90 are circumferentially aligned with one of a plurality of fuel nozzles 92 (one shown) and a respective hood port 94 to project through the bulkhead assembly 88. The bulkhead assembly 88 includes a bulkhead support shell 96 secured to the combustor wall assemblies 60, 62 and a plurality of circumferentially distributed bulkhead heat shields or panels 98 secured to the bulkhead support shell 96 around each respective swirler 90 opening. The bulkhead support shell 96 is generally annular and the plurality of circumferentially distributed bulkhead panels 98 are segmented, typically one to each fuel nozzle 92 and swirler 90.

The annular hood 86 extends radially between, and is secured to, the forwardmost ends of the combustor wall assemblies 60, 62. Each one of the plurality of circumferentially distributed hood ports 94 receives a respective on the plurality of fuel nozzles 92, and facilitates the direction of compressed air into the forward end of the combustion chamber 66 through a swirler opening 100. Each fuel nozzle 92 may be secured to the diffuser case module 64 and projects through one of the hood ports 94 into the respective swirler 90.

The forward assembly 84 introduces core combustion air into the forward section of the combustion chamber 66 while the remainder of compressor air enters the outer annular plenum 70 and the inner annular plenum 74. The plurality of fuel nozzles 92 and adjacent structure generate a blended fuel-air mixture that supports stable combustion in the combustion chamber 66.

Figure 3:
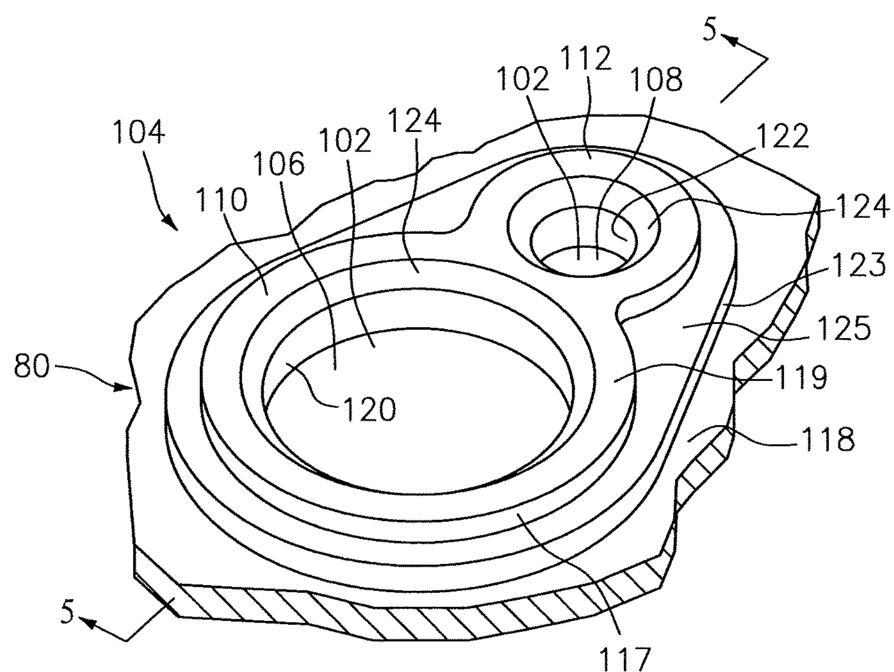
FIG. 3 is a partial perspective view of a conjoined grommet assembly according to one non-limiting example of the present disclosure.
Figure 4:
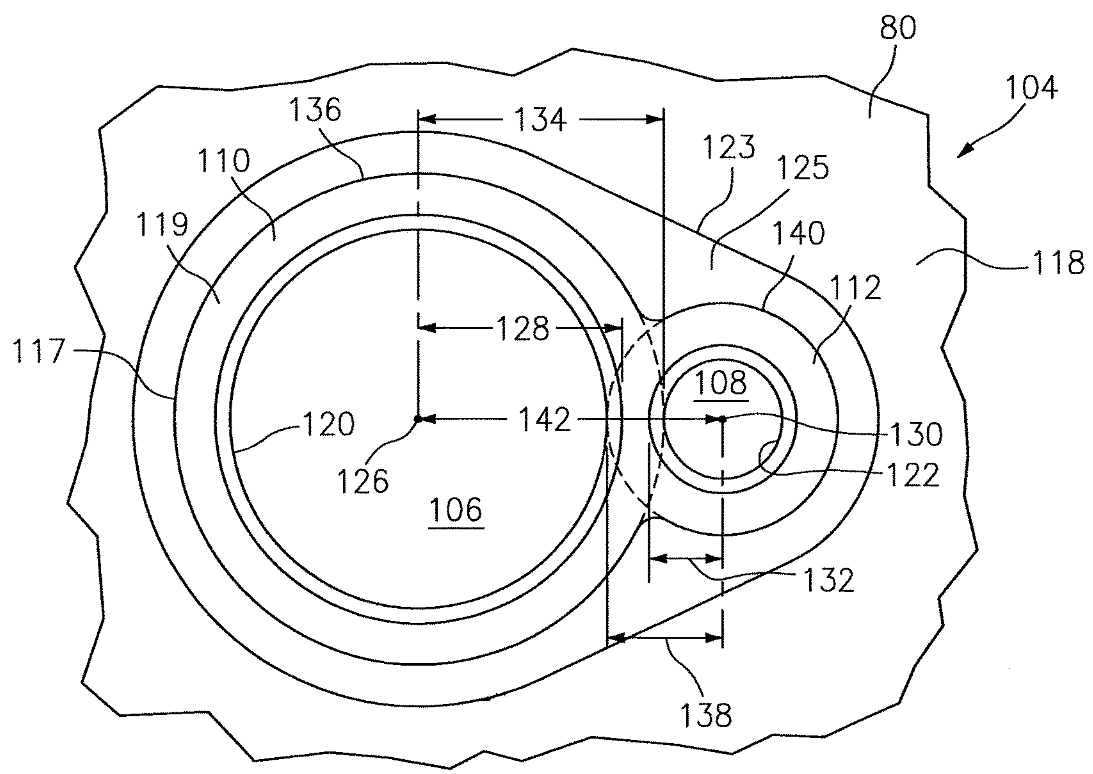
FIG. 4 is a plan view of the conjoined grommet assembly.
Figure 5:
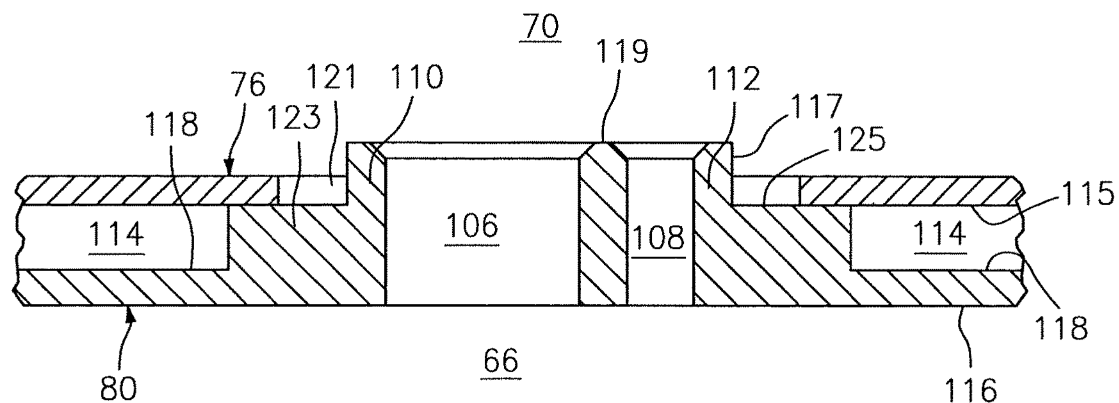
FIG. 5 is a cross section view of the conjoined grommet assembly taken along line 5-5 of FIG. 3.

Referring to FIGS. 3 through 5, the wall assemblies 60, 62 of the combustor 56 have a plurality of dilution holes 102 generally spaced circumferentially about the respective wall assemblies 60, 62. The dilution holes 102 inject dilution air from the outer and inner plenums 70, 74 and into the combustion chamber 66 to facilitate low emissions, and reduce and control the temperature profile of combustion gases at the combustor outlet to protect the HPT 54. To ensure a satisfactory temperature profile at the chamber 66 exit plane, there must be adequate penetration of the dilution air, coupled with the correct number of dilution holes 102 to form sufficient localized mixing zones. The penetration of a round dilution hole is generally a function of its diameter. That is, if the total dilution-hole area is spread over a large number of small holes, penetration will be inadequate, and a hot core will persist through the dilution zone of the chamber 66. In the opposite extreme, the use of a small number of large holes will result in a cold core due to over-penetration and unsatisfactory mixing.

To optimize this outlet temperature profile, dilution holes 102 are part of a conjoined grommet assembly 104. Each wall assembly 60, 62 may have at least one conjoined grommet assembly 104; however, for the sake of explanation the outer wall assembly 60 and the related shell 76 and heat shield 80 will be used to describe the conjoined grommet assembly 104. Each assembly 104 includes at least two dilution holes 102 where one dilution hole may be a primary dilution hole 106 and another dilution hole is a smaller, secondary, or wake hole 108. Each dilution hole 106, 108 are generally defined by respective bosses or grommets 110, 112. The grommets 110, 112 are substantially located in a cooling cavity 114 defined between a cold side 118 of the heat shield 80 and an inner side 115 of the shell 76. Each grommet 110, 112 may further project from the heat shield 80, through the shell 76, and into the plenum 70. Although not illustrated, the shell 76 typically includes a plurality of impingement holes that flow cooling air from the cooling plenum 70 and into the cavity 114. From the cavity, cooling air is then flowed through heat shield effusion holes and into the combustion chamber 66. In contrast, the grommets 110, 112 prevent the dilution holes 106, 108 from communicating with the cavity 114 and instead function to flow cooling air directly from the cooling plenum 70 and into the combustion chamber 66.

The grommets 110, 112 may be integral, unitary to, and formed as one piece to the heat shield or heat shield panel 80. The grommets may be flush with a hot side 116 of the heat shield 80 and project outward from the opposite cold side 118 of the heat shield 80. The dilution holes 106, 108 are spaced close enough so that the respective grommets 110, 112 join one-another and share a common outer face 117 that generally faces radially outward with respect to the dilution holes 106, 108. Each grommet 110, 112 is defined radially (with respect to the respective dilution holes 106, 108) between the common outer face 117 and respective inner faces 120, 122 that define the respective dilution holes 106, 108. Each dilution hole 106, 108 may be round as illustrated; however, it is understood and contemplated that the holes may be any variety of shapes including oblong or oval. The faces 120, 122 may further include a chamfer 124 for enhancing air flow entering the respective holes 106, 108 generally at the shell 76.

The grommets 110, 112 have a common boss 123, that is generally in the cavity 114 and projects from the heat shield 80 and to a distal seat 125 of the boss. The seat 125 has a cylindrical contour facing radially, with respect to the engine axis A, for sealable engagement to the inner side 115 of the shell 76 opposite the plenum 70. Each grommet 110, 112 has conjoined distal end portions having the common outer face 117 and that generally project radially outward from the seat 125 and through a single, oblong opening 121 in the shell 76. The distal end portions of the grommets 110, 112 also have a common distal face 119 that generally faces radially with respect to the engine axis A. The common distal face 119 may be shaped as a figure-eight surrounding and circumventing both holes 106, 108 and is located outward from the shell 76 and thus in the plenum 70. It is further contemplated and understood that the integral, unitary, joining of the grommets 110, 112 and associated boss 123 may be to the shell 76, and the sealable joining is to the heat shield 80, or that the grommets are not integral to either the shell 76 or the heat shield 80, and instead removably seal to both.

The continuous face 120 carried by the grommet 110 generally surrounds a centerpoint 126 and the grommet 110 has an inner radius vector 128 measured from the centerpoint 126 to the perimeter of where the continuous inner face 120 generally meets the common distal face 119. Likewise, the continuous inner face 122 carried by the grommet 112 generally surrounds a centerpoint 130 and the grommet 112 has an inner radius vector 132 measured from the centerpoint 130 to the perimeter of where the continuous inner face 122 generally meets the common distal face 119. The grommet 110 further has an outer radius vector 134 measured from the centerpoint 126 and to an outer perimeter 136 of the grommet and substantially located at the common outer wall 117. Likewise, the grommet 112 has an outer radius, vector 138 measured from the centerpoint 130 and to an outer perimeter 140 of the grommet and substantially at the common outer wall 117. It is understood and contemplated that use of the term "radius vector" is in consideration that the dilution holes 106, 108 may not be round, hence the radius vector may change as measurements are taken along the circumference from the centerpoints. It is also understood that should the dilution holes 106, 108 be round, the term "radius" can be interchanged with "radius vector."

The dimensional relationship between the grommets 110, 112 of the assembly 104 is such that a distance 142 measured between centerpoints 126, 130 is less than the summation of the outer radius vectors 134, 138 and more than the summation of the inner radius vectors 128, 132. A seat width 144 (see FIG. 5) taken between dilution holes 106, 108 is thus the function of the distance 142 minus the summation of the inner radius vectors 128, 132, which is greater than zero. It is understood and contemplated that when measuring the outer radius vectors 134, 138 directly between centerpoints 126, 130, the outer perimeters 136, 140 of the respective grommets 110, 112 may have to be extrapolated (i.e. through where the common outer wall 117 is not located) because the grommets are conjoined at this location.

Figure 6:
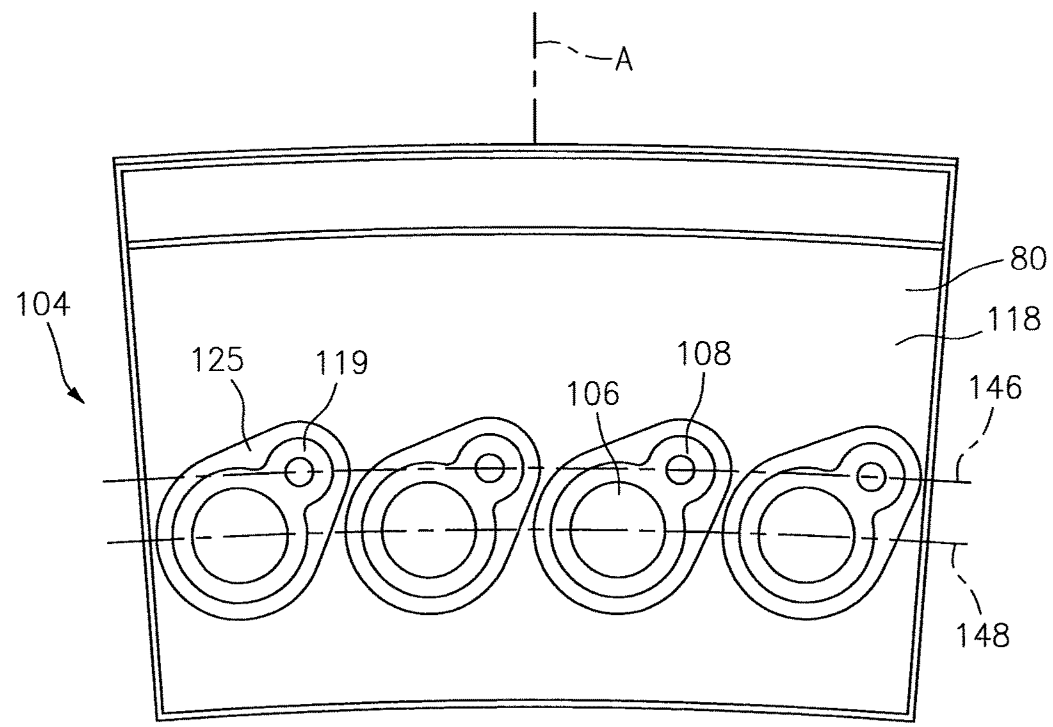
FIG. 6 is a plan view of a heat shield panel having a plurality of the conjoined grommet assemblies.

Referring to FIG. 6, a plurality of conjoined dilution hole grommet assemblies 104 are illustrated on a single panel of the heat shield 80. The wake holes 108 are spaced circumferentially from one-another and aligned to a centerline 146. The primary dilution holes 106 are also spaced circumferentially from one another and aligned to a centerline 148 disposed axially downstream from the centerline 146. Each wake hole 108 is also circumferentially offset from the associated primary dilution hole 106. The bosses 123 from one assembly 104 to the next do not join thus the cooling cavity 114 is not isolated or blocked off from an upstream and downstream perspective.

Figure 7:
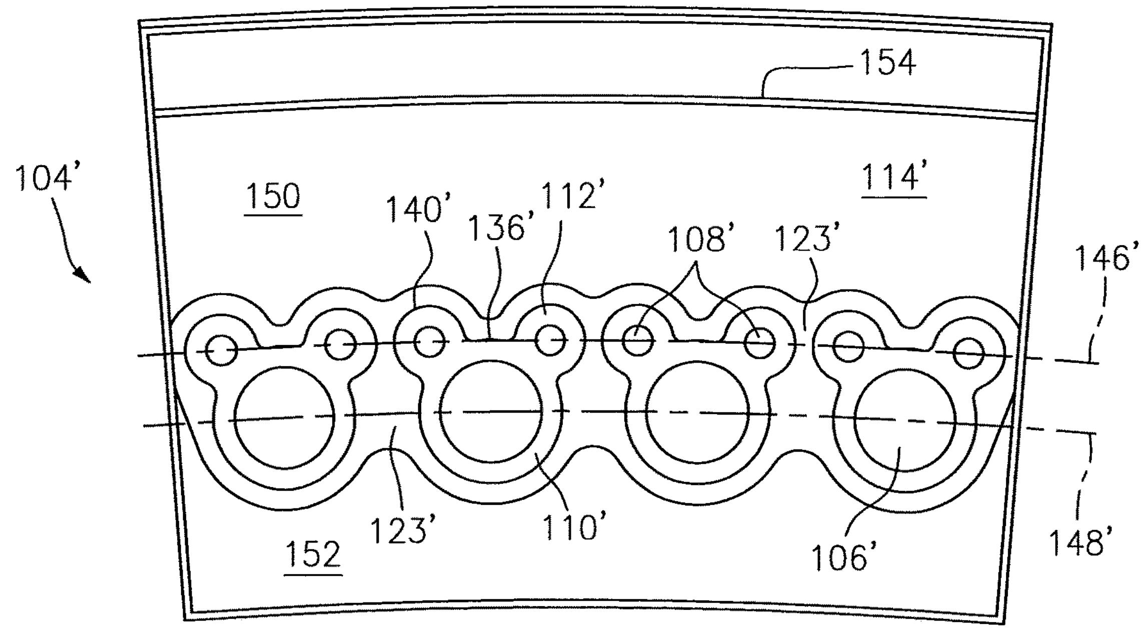
FIG. 7 is a plan view of a second example of a heat shield panel.

Referring to FIG. 7, a second example of a conjoined grommet assembly is illustrated wherein like components have the same element numbers except with the addition of a prime symbol. In the second example, the conjoined grommet assembly 104' has two wake holes 108' associated with each primary dilution hole 106'. Moreover, the bosses 123' from one conjoined grommet assembly 104' to the next are joined thus circumferentially continuous within the cooling cavity 114'. The cooling cavity 114' is thus divided into an upstream portion 150 and a downstream portion 152 isolated from the upstream portion 150. That is, the conjoined bosses 123' from one assembly to the next act similar to a more traditional rib 154, thus serving a dual function to isolate the cavity into upstream and downstream portions 150, 152 and seal to the shell thereby isolating the dilution holes from the cavity.

Figure 8:
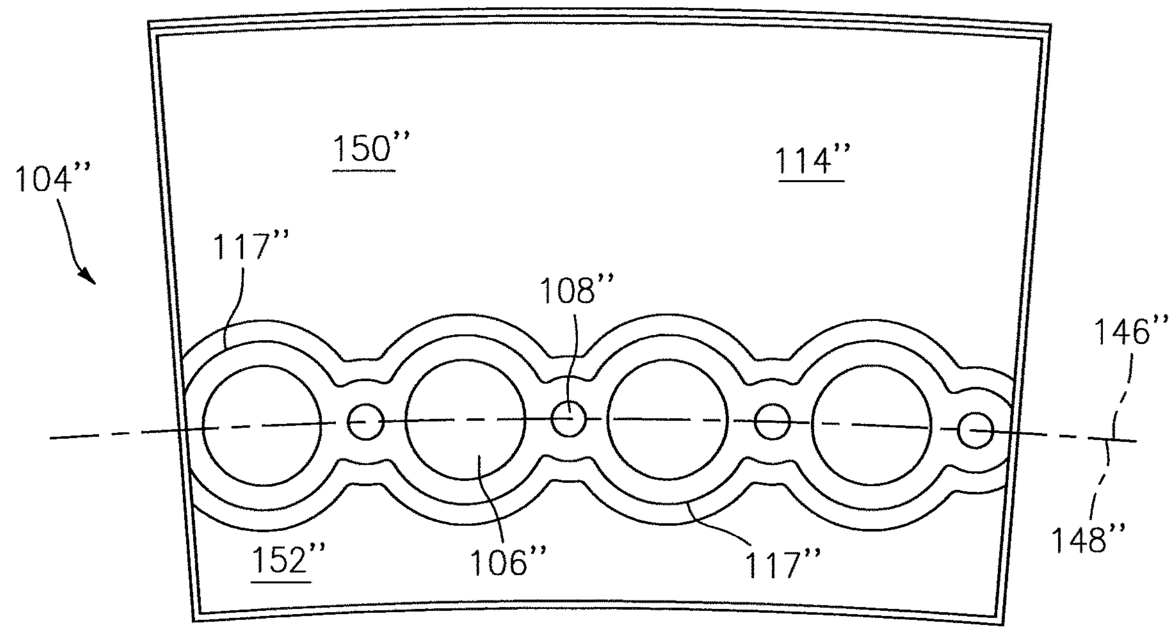
FIG. 8 is a plan view of a third example of a heat shield panel.

Referring to FIG. 8, a third example of a conjoined grommet assembly is illustrated wherein like components have the same element numbers except with the addition of a double prime symbol. The third example is similar to the second example because the upstream portion 150" is segregated from the downstream portion 152" by the assembly 104." The third example is different from the first example of FIG. 6 in that the centerlines 146", 148" coextend and are not axially offset. Furthermore, the circumferentially continuous attribute of an outer wall 117" alleviates the need for respective openings in the shell for each assembly 104" and instead may break the shell into two separate upstream and downstream parts (not shown).

It is understood that relative positional terms such as "forward," "aft," "upper," "lower," "above," "below," and the like are with reference to the normal operational attitude and should not be considered otherwise limiting. It is also understood that like reference numerals identify corresponding or similar elements throughout the several drawings. It should be understood that although a particular component arrangement is disclosed in the illustrated embodiment, other arrangements will also benefit. Although particular step sequences may be shown, described, and claimed, it is understood that steps may be performed in any order, separated or combined unless otherwise indicated and will still benefit from the present disclosure.

The foregoing description is exemplary rather than defined by the limitations described. Various non-limiting embodiments are disclosed; however, one of ordinary skill in the art would recognize that various modifications and variations in light of the above teachings will fall within the scope of the appended claims. It is therefore understood that within the scope of the appended claims, the disclosure may be practiced other than as specifically described. For this reason, the appended claims should be studied to determine true scope and content.

What is claimed is:

1. A combustor assembly for a combustor, comprising:
 a plurality of grommet assemblies, each grommet assembly including
  a first grommet defining at least in-part a first dilution hole; and
  a second grommet defining at least in-part a second dilution hole and in contact with the first grommet;
 a combustor heat shield including a hot side and an opposite cold side;
 a combustion chamber defined at least in-part by the combustor heat shield; and
 a shell spaced from and opposing the cold side with a cooling cavity defined between the cold side and the shell and containing at least in part the first and second grommets;
 where the first grommet is joined to the combustor heat shield and defines at least in part the first dilution hole communicating through the combustor heat shield;
 where the second grommet is joined to the first grommet and the combustor heat shield and defines at least in-part the second dilution hole communicating through the combustor heat shield;
 where each grommet assembly is contained at least in part within the cooling cavity;
 where the combustor heat shield is substantially cylindrical and concentric to an axis of the combustor; and
  wherein the plurality of grommet assemblies are joined and extend circumferentially continuously within the cooling cavity so that air within an upstream portion of the cooling cavity is prevented from flowing into a downstream portion of the cooling cavity by the plurality of grommet assemblies.

2. The combustor assembly set forth in claim 1, wherein the first and second grommets share a common outer face.

3. The combustor assembly set forth in claim 1, wherein the first grommet includes a first centerpoint, a first outer perimeter, and a first distance from the first centerpoint to the first outer perimeter; the second grommet includes a second centerpoint, a second outer perimeter, and a second distance from the second centerpoint to the second outer perimeter; and, a distance between the first and second centerpoints being less than the sum of the first and second distances when measured between the first and second centerpoints.

4. The combustor assembly set forth in claim 3, wherein the first and second distances are outer radius vectors.

5. The combustor assembly set forth in claim 4 wherein the radius vectors are radii.

6. The combustor assembly set forth in claim 1, wherein the first dilution hole is defined by a continuous first inner face and the second dilution hole is defined by a continuous second inner face.

7. The combustor assembly set forth in claim 6 wherein the first dilution hole is a primary dilution hole and the second dilution hole is a wake hole.

8. The combustor assembly set forth in claim 7 further comprising a third grommet defining a second wake hole conjoined to the grommet defining the primary dilution hole.

9. The combustor assembly set forth in claim 1, wherein the first and second dilution holes communicate through the shell.

10. The combustor assembly set forth in claim 1, wherein the first and second grommets together define a seat.

11. The combustor assembly set forth in claim 10, wherein the seat has a cylindrical contour.

12. The combustor assembly set forth in claim 10, wherein the seat seals upon the shell.

13. The combustor assembly set forth in claim 12, wherein the first and second grommets are an integral part of and unitary to the combustor heat shield.

14. The combustor assembly set forth in claim 1, wherein the first dilution hole is a primary dilution hole and the second dilution hole is a wake hole.

15. The combustor assembly set forth in claim 14, wherein the plurality of wake holes are axially offset upstream from the plurality of primary dilution holes.

16. The combustor assembly set forth in claim 14, wherein each one of the plurality of wake holes are disposed circumferentially between adjacent primary dilution holes of the plurality of primary dilution holes.

* * * * *